United States Patent
Frazier et al.

(10) Patent No.: US 7,409,448 B2
(45) Date of Patent: Aug. 5, 2008

(54) METHOD, SYSTEM, AND STORAGE MEDIUM FOR RESOLVING CONTENTION ISSUES DURING CHANNEL PROGRAM EXECUTION

(75) Inventors: Giles R. Frazier, Austin, TX (US); Robert J. Dugan, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 937 days.

(21) Appl. No.: 10/723,409

(22) Filed: Nov. 25, 2003

(65) Prior Publication Data
US 2005/0198254 A1 Sep. 8, 2005

(51) Int. Cl.
G06F 15/173 (2006.01)
H04J 3/02 (2006.01)

(52) U.S. Cl. ...... 709/225; 370/462
(58) Field of Classification Search ...... 709/225; 370/462
See application file for complete search history.

(56) References Cited

U.S. PATENT DOCUMENTS

| | | | |
|---|---|---|---|
| 5,465,355 A | 11/1995 | Cook et al. | 710/38 |
| 5,867,648 A | 2/1999 | Foth et al. | 395/200.6 |
| 6,240,446 B1 | 5/2001 | Casper et al. | 709/213 |
| 6,338,083 B1 | 1/2002 | Casper et al. | 709/213 |
| 6,671,284 B1 * | 12/2003 | Yonge et al. | 370/462 |
| 2002/0120740 A1 * | 8/2002 | Ho et al. | 709/225 |

* cited by examiner

*Primary Examiner*—Jason Cardone
*Assistant Examiner*—Chirag R Patel
(74) *Attorney, Agent, or Firm*—Cantor Colburn LLP; William A. Kinnaman, Jr.

(57) ABSTRACT

An exemplary embodiment of the invention relates to a method, system, and storage medium for resolving contention issues by a channel in a fiber optic switch environment that occur during channel program execution. The method comprises a channel receiving a status packet indicating a device is no longer busy. The method also includes specifying whether the channel intends to re-initiate a channel program that previously resulted in the device busy status. If the channel does not intend to re-initiate the channel program, a first combination of bits in a re-initiate field of a status-acceptance packet are set which indicate that the channel will take no further action. If the channel intends to re-initiate the channel program, a second combination of bits in the re-initiate field of the status-acceptance packet are set, indicating that the channel will re-initiate the channel program. The method further includes transmitting the status-acceptance packet to a control unit. The invention also includes a system and a storage medium.

7 Claims, 3 Drawing Sheets

METHOD, SYSTEM, AND STORAGE MEDIUM FOR RESOLVING CONTENTION ISSUES DURING CHANNEL PROGRAM EXECUTION

BACKGROUND OF THE INVENTION

The present invention relates generally to network computing and, more particularly, to a method, system, and storage medium for resolving contention issues among channels that occur during channel program execution.

Utilizing a current protocol such as the FC-SB-3 protocol (FICON), a control unit (CU) typically responds to the first command issued by a channel for a new channel program with a 'device-busy' status indication in situations when its resources are completely utilized. When this occurs, the CU 'owes' the channel a 'no-longer-busy' status response when the CU becomes not busy. When the channel receives the 'no-longer-busy' status, it accepts the status and ends the connection with the CU. Subsequently, if the channel still needs to initiate the new channel program, it is re-initiated by sending a new command.

The FICON protocol encounters problems if, during the time that a CU is busy, it receives requests from several channels to initiate new channel programs. In this instance, the CU responds to all of the channels with a 'device-busy' status. When the CU becomes no longer busy, it can either send a 'no-longer-busy' status to all the channels simultaneously, or it can send the 'no-longer-busy' status to a single channel at a time. In many cases, both of these alternatives result in some of the channels timing out while waiting for the 'no-longer-busy' status.

If the CU sends a 'no-longer-busy' status to all of the channels simultaneously, it waits for one of the channels to re-initiate the channel program. When the CU receives the command from the first channel that re-initiates the channel program, it begins execution of that channel program. When the other channels attempt to re-initiate their respective channel programs, the CU responds to each of them with a 'device-busy' status. When the CU completes the channel program and again becomes no longer busy, it once again sends a 'no-longer-busy' status to those channels to which it has previously sent a 'device-busy' status. As in the first case, the CU becomes busy once again when it receives a command from the first channel that re-initiates a channel program, and it responds with a 'device-busy' status to other channels which attempt to re-initiate channel programs. This mode of operation causes problems because each time the CU sends a 'no-longer-busy' status to all of the channels, there is a race among the channels to re-initiate the channel program. Since the fastest channel typically wins the race, the slower channels are prevented from initiating their channel programs for long time periods. In many cases, these time periods are so long that upper-level software timers expire, and the applications running on these channels fail.

In order to eliminate the race described above, the CU may alternatively send a 'no-longer-busy' status to a single channel at a time. After sending a 'no-longer-busy' status to a given channel, it waits for the channel to respond by initiating a new channel program. When that channel program is complete, the CU sends a 'no-longer-busy' status to the next channel, and allows that channel to respond. This process continues until the CU has sent a 'no-longer-busy' status to all of the channels to which it owes this response. Although this mode of operation avoids causing a race among the channels, another problem occurs when a channel no longer needs to initiate a new channel program when it receives the 'no-longer-busy' status. This typically occurs when software has awaited completion of the pending operation until a 'Missing Interrupt Handler' timeout has occurred, in which case the software withdraws the pending I/O request. In this case, the CU waits a model-dependent time period before assuming that the channel has decided not to initiate a new channel program. The time that the CU needs to wait is often well over ten milliseconds because it takes some of the slower channels this long to re-initiate an I/O operation after receiving a 'no-longer-busy' status. During the time when the CU is waiting, timers that are running on all of the other channels that received the 'device-busy' status begin to timeout, causing the channels to enter more catastrophic recovery sequences and thereby compounding the problem.

What is needed, therefore, is a way to resolve these contention issues among channels during channel program execution.

SUMMARY

The shortcomings of the prior art described above are overcome and additional advantages are provided by the contention resolution system of the invention.

An exemplary embodiment of the invention relates to a method, system, and storage medium for resolving contention issues by a channel in a fiber optic switch environment that occur during channel program execution. The method comprises a channel receiving a status packet indicating a device is no longer busy. The method also includes specifying whether the channel intends to re-initiate a channel program that previously resulted in the device busy status. If the channel does not intend to re-initiate the channel program, a first combination of bits in a re-initiate field of a status-acceptance packet are set which indicate that the channel will take no further action. If the channel intends to re-initiate the channel program, a second combination of bits in the re-initiate field of the status-acceptance packet are set, indicating that the channel will re-initiate the channel program. The method further includes transmitting the status-acceptance packet to a control unit. The invention also includes a system and a storage medium.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

The contention resolution system of the invention provides a method and system for enhancing a simple indication of acceptance to 'no-longer-busy' status that also carries information about whether or not a channel intends to attempt re-initiation of an operation. This information informs the control unit (CU) of the channel's intentions regarding the re-initiation of the I/O operation, thereby eliminating the need for the CU to wait for the channel. The elimination of the wait time, which can be well over 10ms, allows the CU to return a 'no-longer-busy' status to other channels almost immediately. This may significantly reduce the probability that these other channels will experience timeouts waiting for the 'no-longer-busy' status, thereby reducing error recovery problems that commonly occur using existing technology. The use of new bits in the 'status-acceptance' information unit (IU) eliminates these timeouts in most cases, without requiring any re-definition of the FICON usage of FibreChannel transport-layer facilities.

The contention resolution system utilizes Single-Byte Command Code Sets-3 Mapping Protocol (FC-SB-3) of status in response to a request to initiate channel program execution. Information regarding FC-SB-3 can be found in "Fiber-Channel Single-Byte Command Code Sets-3, (FC-SB-3)," Rev 1.6, by the American National Standards Institute and is incorporated herein by reference in its entirety. An enhanced form of a status-acceptance packet that a channel sends in response to the 'device-no-longer-busy' status is described. The new status-acceptance packet includes a new field that indicates whether or not the channel intends to re-initiate a channel program for the device. This indication eliminates the need for a control unit to wait for the channel to re-initiate the operation in the case where the channel is not going to re-initiate the operation, thereby significantly enhancing overall performance.

Figure 1:
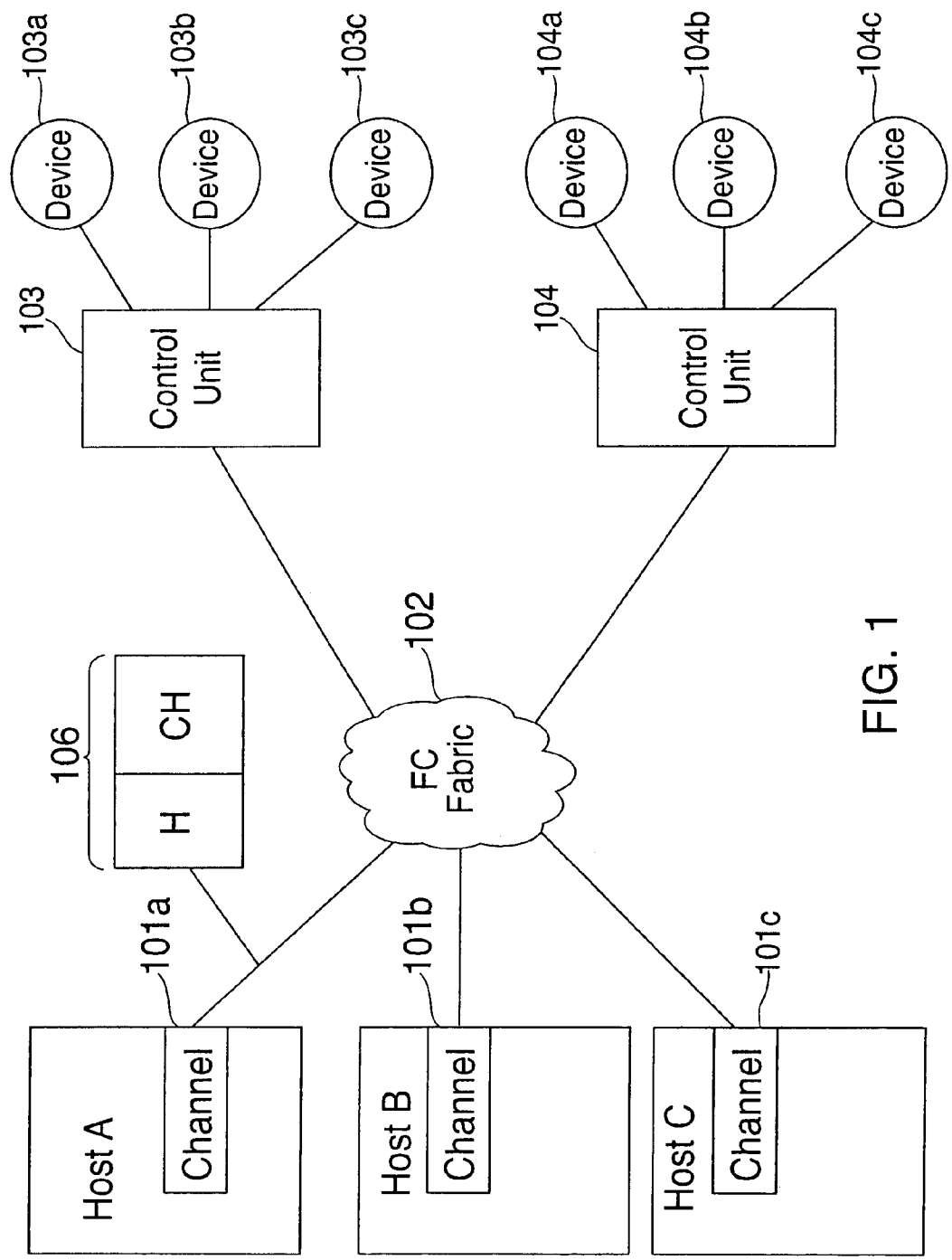
FIG. 1 is a block diagram of a system in which the contention resolution system may be used in an exemplary embodiment of the invention.

Referring now to FIG. 1, a typical configuration in which the contention resolution system may be implemented is described. FIG. 1 includes channels 101a-101c that are under the control of host computing systems (also referred to herein as 'hosts') A-C, respectively. Hosts A-C refer to enterprise servers such as IBM's Z900™ servers. Hosts A-C are attached to a FibreChannel Fabric 102. A FibreChannel Fabric refers to a network transport that provides switching and interconnection capabilities for large enterprise servers and storage area networks. An example of a FibreChannel Fabric is a McData™ fiber optic switch model ED6140. Control units (CUs) 103 and 104 refer to shared storage subsystems and are also attached to FibreChannel Fabric 102. Each control unit 103, 104 controls three input/out (I/O) devices (also referred to herein as simply "devices"). Control unit 103 controls devices 103a-103c, and control unit 104 controls devices 104a-104c. Each of control units 103 and 104 may be an IBM™ TotalStorage Enterprise Storage Server 2105-800™. An example of a device 103a-103c includes a hard drive attached to a control unit. Also included in FIG. 1 is a sample status-acceptance packet 106. Status-acceptance packet 106 refers to data transmitted by a channel in response to a device 'no-longer-busy' status as will be described further herein.

In order to access a device 103a-c, 104a-c, a channel 101a-c sends a command that initiates a channel program to the CU 103, 104 that controls the particular device. A channel program includes a sequence of commands that designate the operations that the device is to perform on behalf of the channel. If the CU 103, 104 accepts the command, then it performs internal operations that cause the device (one of 103a-c, 104a-c) to execute the command, as well as subsequent commands in the channel program. Each device 103a-c, 104a-c is capable of executing only a single channel program at a time. If another channel attempts to initiate a channel program to a device that is currently executing a channel program with a different channel, the respective control unit responds with a status indicating "device-busy".

After a CU 103, 104 has sent a device-busy indication for a given device (one of 103a-c, 104a-c) to the appropriate channel (one of 101a-c), it is said to 'owe' the channel a 'device-no-longer-busy' indication when the device becomes not busy. The 'device-no-longer-busy' indication is in a status packet. When the channel receives the device-no-longer busy indication in a status packet, it accepts the status by sending a status-acceptance packet. Subsequently, if channel still needs to initiate the channel program, it re-initiates the channel program by sending a new command.

As indicated above, the FC-SB-3 protocol incurs a problem if, during the time when a device is busy, the CU controlling the device receives requests from several channels to initiate new channel programs with the same device. In this scenario, the CU responds to all of the channels 101a-c (except the channel for which it is executing a channel program) with a 'device-busy' status, because the device can process only one channel program at a time. When the device completes the channel program and becomes not busy, the CU needs to send a 'device-no-longer-busy' indication to all of the channels to which it previously sent a 'device-busy' status. At this time, the CU can either send a 'device-no-longer-busy' status to all the channels simultaneously, or it can send the 'no-longer-busy' status to a single channel at a time. In many cases, use of either of these alternative results in some of the channels timing out while waiting for the device-no-longer-busy status, as explained above.

The indication of intent to re-initiate a channel program as described in this invention informs the CU of the channel's intentions regarding re-initiation of an I/O operation, thereby eliminating the need for the CU to wait for the channel. The elimination of the wait time, which can be well over 10 milliseconds, allows the CU to return a 'no-longer-busy' status to other channels almost immediately. This significantly decreases the probability that these other channels will experience timeouts waiting for the 'no-longer-busy' status, thereby reducing error recovery problems. Such compounded error recovery problems are common using today's existing technology.

It will be understood by those skilled in the art that the capabilities of the present invention described herein may be implemented in software, firmware, hardware or some combination thereof.

The contention resolution system describes the content of, and processing rules for, an enhanced form of status-acceptance packet that the channel sends in response to a device 'no-longer-busy' status. The enhanced form of status-acceptance packet 106 contains header fields H and a control header field CH that are present in the current status-accepted packet, and a re-initiate field that indicates to the CU whether or not the channel intends to re-initiate a channel program for the device. The re-initiate field can be defined as part of the control parameters field of the control header of the current status-accepted packet. Details of the FC-SB-3 protocol and the current status-accepted packet may be found in "Fiber Channel-Single-Byte Command-Code Sets-3 Mapping Protocol (FC-SB-3), rev 1.6, by the American National Standards Institute. Since there are several bits in the control parameters field of the control header of the current status-accepted packet that are currently reserved and set to zero, two of these currently-reserved may be used for the re-initiate field as shown in the table below.

| Value | Intention to Re-initiate |
| --- | --- |
| 00 | No indication of intention to re-initiate |
| 01 | No intent to re-initiate |
| 10 | Intend to re-initiate |
| 11 | Reserved |

If the re-initiate field is set to b '01', it indicates that the channel does not wish to reinitiate the channel program. In this case, the CU may immediately send a 'no-longer-busy' status to another channel or all of the channels to which the CU owes a 'no-longer-busy' status, whichever is applicable.

If the re-initiate field is set to b '10', it indicates that the channel does intend to initiate a channel program within a specified time period. In this case, the CU waits for the specified time period for the channel to initiate the channel program. If the CU does not receive a new command from the channel initiating a new channel program within the specified time period, the CU sends a 'no-longer-busy' status to another channel for which it previously sent a 'busy' status or to all of the channels to which it owes a 'no-longer-busy' status, whichever is applicable.

Existing channel implementations do not set either of the bits in the re-initiate field, as the field is currently reserved. Thus, if the re-initiate field is set to b '00', the CU waits a model-dependent timeout for a command initiating a new channel program from the channel. This model-dependent timeout is usually longer than the pre-specified timeout that the control unit waits if the re-initiate field were set to b '10'. The reason for this longer timeout period for this case is because existing channel implementations that do not implement re-initiate field do not usually initiate a new channel program as quickly as newer channel implementations which do implement re-initiate field.

As indicated above, the contention resolution system provides an enhanced form of status-acceptance packet that a channel sends in response to a device 'no-longer-busy' status. The new status-acceptance packet includes a new field that indicates to the CU whether or not the channel intends to re-initiate a channel program for the device.

Figure 2:
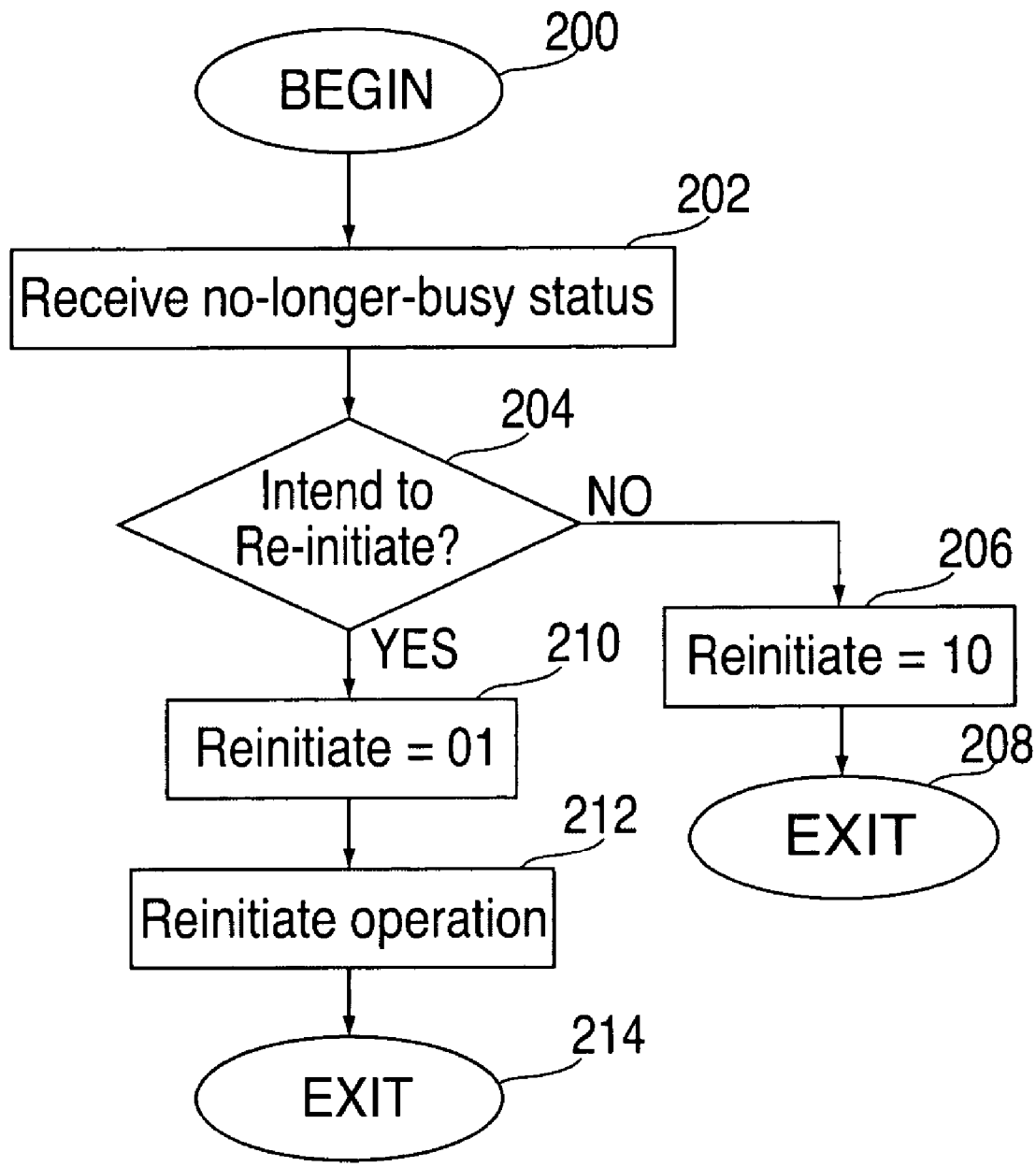
FIG. 2 is a flow diagram describing operations performed by a channel utilizing the contention resolution system in an exemplary embodiment of the invention.

FIG. 2 illustrates a process describing how a channel uses the contention resolution system. At step 200, the process of FIG. 2 begins when a channel such as channel 101a, having previously received a 'device-busy' indication, receives a status packet indicating a 'device-no-longer-busy' indicator at step 202. At step 204, it is determined whether the channel 101a intends to re-initiate the channel program. If the channel does not intend to re-initiate the channel program, the re-initiate bits are set to 10 at step 206 and the process exits at step 208. If, on the other hand, the channel 101a intends to re-initiate the operation at step 204, the re-initiation bits are set to 01 at step 210. In this case, the channel 101a re-initiates the channel program at step 212 and exits the process at step 214.

Figure 3:
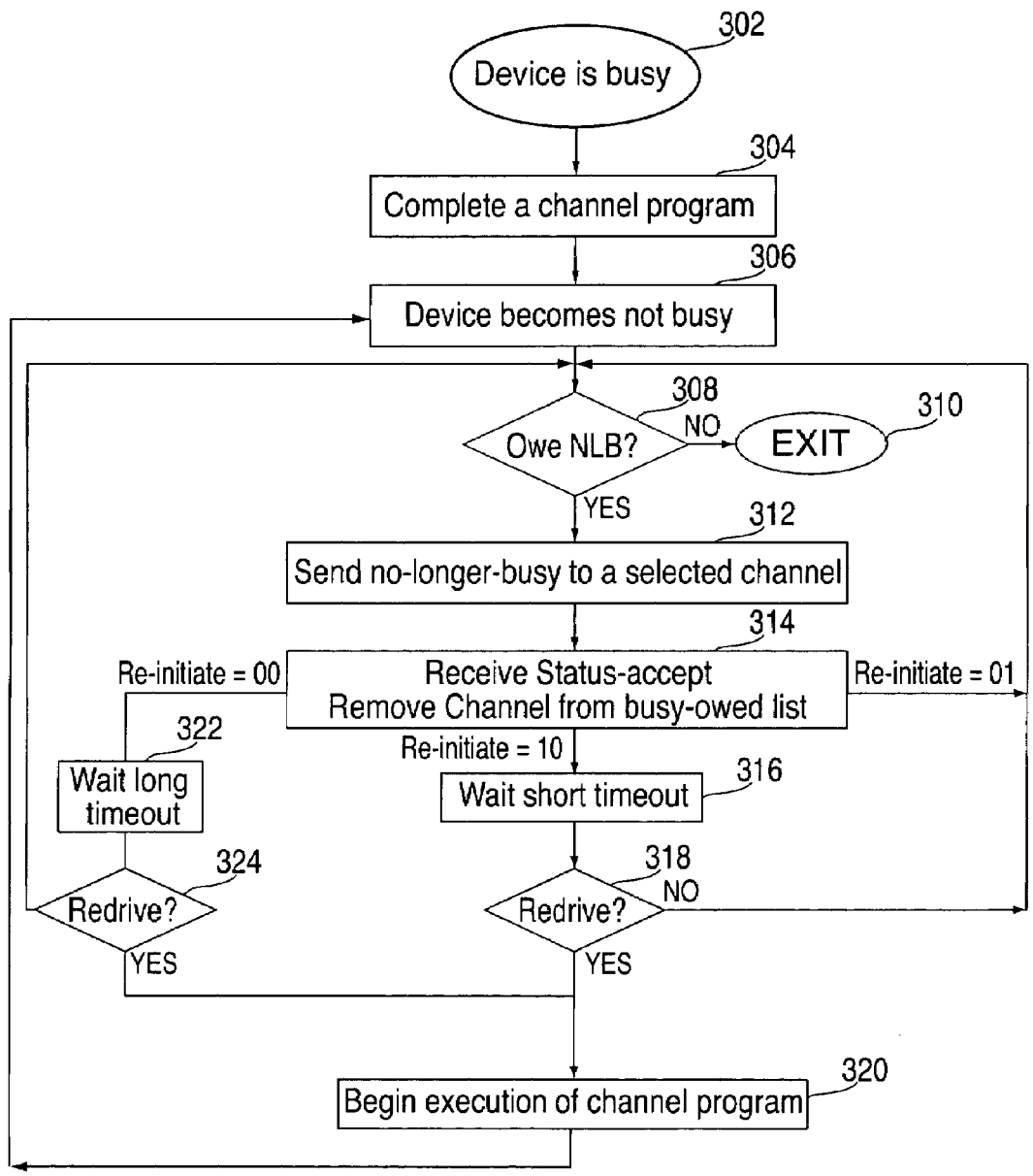
FIG. 3 is a flow diagram describing operations performed by a control unit utilizing the contention resolution system in accordance with a further aspect of the invention.

FIG. 3 illustrates a flow diagram describing how a control unit uses the contention resolution system. At step 302, the process of FIG. 3 begins when a device (such as device 103a) controlled by a control unit 103 becomes busy at step 302. When the device 103a completes its operations at step 304 (e.g., completes the channel program that it is executing, it becomes not busy at step 306. At this time, the CU 103 determines if it owes a device 'no-longer-busy' status to any channels 101a-c at step 308. If the CU 103 does not owe a 'no-longer-busy' status to any channels 101a-c, it exits the procedure at step 310. If the CU 103 owes a 'no-longer-busy' status to at least one channel at step 308, it sends a status packet indicating a 'no-longer-busy' to one of the channels at step 312 and the CU waits for a status-acceptance packet. Alternatively, the CU may send a 'no-longer-busy' status to all of the channels to which it owes a 'no-longer-busy' status. The channel to which the 'no-longer-busy' status is sent may be selected in any manner by the CU. However, if the 'no-longer-busy' status is owed to both channels that do and do not support the contention resolution system of the invention, the CU preferably selects the channels that support the contention resolution system before attempting to select channels that do not support the contention resolution system. In this manner, potentially long delays that are caused when a channel is selected that does not support this invention are avoided.

When the status-acceptance packet is received at step 314, one of three actions may occur. If the re-initiate field is set to b '01', indicating that the channel does not intend to re-initiate the channel program, the process returns to step 308 whereby the CU again determines if it owes a 'device-no-longer-busy' status to another channel, and proceeds as described above in steps 310-314. If the re-initiate field is set to b '01', indicating that the channel intends to re-initiate the channel program, the CU waits a short time for a command that initiates a new channel program from the channel at step 316. If the re-initiate field is set to b '00', indicating that the channel does not support the contention resolution system of the invention, then the CU waits a longer period of time for a command that initiates a new channel program from the channel at step 322. The wait time for the case where the re-initiate field is set to b '10' is relatively short compared to the wait time used if the re-initiate field were set to b '00' because only newer channels set the re-initiate field to b '01', and these newer channels are able to reinitiate a new channel program more quickly than older channels.

If the CU receives a command initiating a new channel program from the channel to which it sent the 'no-longer-busy' indication before the timeout expires (at either of steps 318 and 324) it begins execution of the channel program at step 320. Upon completion of the execution, the process returns to step 306 where the device again becomes not busy.

When a CU completes an operation and owes a 'no-longer-busy' status to other channels, it may use a variety of algorithms to decide which of the channels to send the 'no-longer-busy' status. One such algorithm may be for the CU to send the 'no-longer-busy' status to some or all of the channels simultaneously. This method of selection might be advantageous in situations where many of the channels implement this invention and do not intend to re-initiate the channel program. In this case, the CU would be able to immediately determine that multiple channels did not intend to re-initiate channel program, thereby eliminating the need to send device-no-longer-busy status to each channel serially.

As can be seen from the above, the contention resolution system provides the means to significantly enhance channel operations and reduce the incidences of channel timeouts with the use of a new status packet (i.e., status-acceptance packet) that is sent in response to a device 'no-longer-busy' status. The status-acceptance packet includes a field that indicates whether or not the channel intends to re-initiate a channel program for a particular device. This indication eliminates the need for a control unit to wait for the channel to re-initiate the operation in the case where the channel is not going to re-initiate the operation.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for resolving contention issues by a channel in a fiber optic switch environment, said contention issues occurring during channel program execution, comprising:
   a channel receiving a status packet indicating that a device is no longer busy, said channel under a device-busy status;
   specifying whether said channel intends to re-initiate a channel program that previously resulted in said device-busy status;
   if said channel intends to re-initiate said channel program, setting a first combination of bits in said re-initiate field of said status-acceptance packet operable for indicating that said channel will re-initiate said channel program, after a first time period;
   if said channel intends to re-initiate said channel program, setting a third combination of bits in said re-initiate field of said status-acceptance packet operable for indicating that said channel will re-initiate said channel program, after a second time period;
   if said channel does not intend to re-initiate said channel program, setting a second combination of bits in a re-initiate field of a status-acceptance packet operable for indicating that said channel will take no further action;
   transmitting said status-acceptance packet to a control unit; and
   re-initiating said channel program in response to said re-initiate field being set by at least one of said first and third combination of bits.

2. The method of claim 1, wherein said re-initiate field is associated with a control header of said status-acceptance packet.

3. A method for resolving contention issues by a control unit in a fibre optic switch environment, said contention issues occurring during channel program execution, comprising:
   identifying at least one channel for which said control unit owes a device no-longer-busy status, said control unit in communication with said device;
   sending a status packet to said at least one channel, said status packet indicating said device is no longer busy;
   receiving a status-acceptance packet from said at least one channel, said status-acceptance packet including a re-initiate field that indicates to the control unit whether or not said at least one channel intends to re-initiate a channel program, said re-initiate field operable for receiving at least one of a first, second and third combination of bits;
   waiting a first period of time for a command initiating a new channel program from said channel if said first combination of bits set in said re-initiate field indicates that said channel intends to re-initiate said channel program and
   re-initiating said channel program in response to said re-initiate field being set by at least one of said first and third combination of bits.

4. The method of claim 3, wherein said re-initiate field is associated with a control header of said status-acceptance packet.

5. The method of claim 4, wherein said second combination of bits set in said re-initiate field indicate that said channel does not intend to re-initiate said channel program.

6. The method of claim 5, wherein said second combination of bits set in said re-initiate field causes said control unit to perform at least one of:
   sending a no-longer-busy status to a second channel to which said no-longer-busy status is owed; and
   sending a no-longer-busy status to all channels for which said no-longer-busy status is owed.

7. The method of claim 4, wherein said third combination of bits set in said re-initiate field causes said control unit to perform:
   waiting a second period of time for a command initiating a new channel program from said channel, said second period of time exceeding said first period of time;
   wherein said waiting a second period of time is operable for enabling said new channel program with said first combination of bits set in said re-initiate field to be initiated before said new channel program with said third combination of bits set in said re-initiate field.

* * * * *